US006632917B1

(12) United States Patent
Kulkarni et al.

(10) Patent No.: US 6,632,917 B1
(45) Date of Patent: Oct. 14, 2003

(54) PRODUCTION OF POLYESTER USING PREBLENDED COBALT-PHOSPHORUS

(75) Inventors: Rehka V. Kulkarni, Charlotte, NC (US); Ligia Dominguez, Seville (ES)

(73) Assignee: Arteva North America S.A.R.L., Zurich (CH)

( * ) Notice: Subject to any disclaimer, the term of this patent is extended or adjusted under 35 U.S.C. 154(b) by 426 days.

(21) Appl. No.: 09/587,064

(22) Filed: Jun. 2, 2000

(51) Int. Cl.[7] .............................................. C08G 63/78
(52) U.S. Cl. .................... 528/275; 528/287; 528/308.6; 524/400; 524/414
(58) Field of Search ................................ 528/287, 275, 528/308.6; 524/400, 414

(56) References Cited

U.S. PATENT DOCUMENTS

| 5,623,047 | A |   | 4/1997  | Yuo et al.     |         |
|-----------|---|---|---------|----------------|---------|
| 5,681,918 | A | * | 10/1997 | Adams et al.   | 528/279 |
| 5,782,963 | A |   | 7/1998  | Nohr et al.    |         |
| 6,042,773 | A | * | 3/2000  | Teramoto et al.| 264/484 |
| 6,326,456 | B2| * | 12/2001 | Kelsey et al.  | 528/279 |
| 6,423,814 | B1| * | 7/2002  | Kato et al.    | 528/272 |

* cited by examiner

Primary Examiner—Suzanne E. McDowell
(74) Attorney, Agent, or Firm—Gregory N. Clements

(57) ABSTRACT

A preblended additive composition and process for the preparation of polyester resins useful in the manufacture of plastic containers such as bottles is disclosed. The additive composition includes a cobalt-containing compound that is preblended with a phosphorous compound. The polyester resin, e.g., a PET resin, may be prepared by reacting ethylene glycol with dimethyl terephthalate (DMT) or terephthalic acid (TA) in an esterification reaction. The additive composition may be prepared by quickly dumping the phosphorus compound into the cobalt compound such as cobalt acetate, and the resulting composition is added to the reactor vessel before the polycondensation reaction. On the other hand, the additive composition may be prepared by slowly dumping the phosphorus compound into the cobalt compound over a period of at least 5 minutes. Such preblending substantially eliminates any yellow or blue color, or haze in the product article.

17 Claims, No Drawings

PRODUCTION OF POLYESTER USING PREBLENDED COBALT-PHOSPHORUS

BACKGROUND OF THE INVENTION

1. Field of the Invention

The present invention relates to polyester resins suitable for the production of plastic containers, such as beverage bottles. Specifically, the present invention is directed to the use of a preblended additive in polyester synthesis reactions to reduce or eliminate unwanted color and/or improve bottle clarity, and to compositions including such preblended additive. More specifically, a cobalt/phosphorus compound or complex is formed and added at the end of esterification or at the beginning of polycondensation during polyester production.

2. Background of the Invention

Polyester resins are extensively used in the packaging industry and especially in the production of plastic bottles for containing a wide variety of liquids, including carbonated and non-carbonated beverages. In the manufacture of bottles, such polymeric resins are extruded and formed into chips. The use of chips in injection molding to make a bottle preform which then is reheated and blown into a mold to produce the final shape of the bottle, is well-known and established in the industry.

One problem that is often encountered in the bottle manufacturing process is the occurrence of a yellow color in the final polyester product. The yellow color in polyester articles results from undesirable side reaction products in the esterification and polycondensation reactions, which impart such yellow color. The yellow color of the polyester resin has resulted in the widespread usage of cobalt compounds as blueing agents in the manufacturing process. Blueing agents counterbalance the yellow color to produce a neutral bottle color. Cobalt acetate is the most common compound and when added in the range of 30–70 ppm (parts per million, weight) is generally sufficient to cover the yellowness in the resin or bottle. The use of cobalt as a blueing agent is more fully described in U.S. Pat. No. 5,623,047.

Although cobalt compounds are very effective against the yellowness problem sometimes cobalt can impart a "blue haziness" to the product, which also is undesirable in the bottle manufacturing process. Microscopic analysis revealed that the haziness corresponded with the presence of particles 500 nanometers in diameter. The particles were identified as cobalt compounds or complexes.

In addition to using cobalt compounds as bluing agents, cobalt can also be used as an esterification catalyst to produce polyester resin, as described in U.S. Pat. Nos. 5,623,047 and 5,782,963. While it is generally recognized that cobalt can reduce the reaction time (enhancing the reaction rate) as an esterification catalyst, use of cobalt can yield resins of low clarity as described in U.S. Pat. No. 5,116,938, due to the aforementioned blue haziness characteristic. Additionally, the presence of cobalt in the polyester process may hinder the catalytic activity of manganese and lithium, which are often used as catalysts in the esterification reaction.

More specifically, polyethylene terephthalate (PET) is typically produced for the manufacture of plastic containers by the so-called DMT (dimethyl terephthalate) process or the TA (terephthalic acid) process. In the conventional DMT process, DMT and ethylene glycol (EG) are used as raw materials. The DMT and EG are reacted in a reaction vessel in the presence of an esterification catalyst at high temperatures, typically around 250° C. The esterification catalyst can be any of various elements including manganese, zinc, calcium and cobalt. The esterification reaction produces the monomer and oligomers. It usually is necessary to arrest the activity of the esterification catalyst in the DMT process to prevent degradation of the resultant polymer and minimize further yellowness. It is known to add phosphorous compounds at the end of the esterification to sequester the catalyst to arrest their catalytic activity.

In the conventional TA process, TA and EG are reacted in a vessel without the addition of catalysts and this direct esterification occurs at high temperatures of about 250° C. to produce monomer and oligomers. The monomer and oligomers are then polymerized by polycondensation under high temperature (250 to 300° C.) and vacuum to produce PET.

It is a primary objective of the present invention to provide polyester resins that are transparent (i.e., have no haziness), and are substantially neutral in color (i.e., have no significant yellowness or blueness) and are suitable for bottle production.

Other objects, features and advantages of the invention will be more fully apparent from the following disclosure and appended claims.

SUMMARY OF THE INVENTION

The present invention provides polyester resins that are transparent (i.e., have no haziness), and have no significant yellowness or blueness, by use of a preblended cobalt-phosphorus complex or compound in the polyester synthesis reaction.

More specifically, the present invention provides an additive composition and process for the production of PET by a dimethyl terephthalate (DMT) or terephthalic acid (TA) process, wherein the final PET resins have good clarity and color characteristics. The PET resins hereinafter more fully described are employed for the manufacture of plastic containers such as bottles. The invention utilizes an improved additive that stabilizes the cobalt and substantially eliminates the "blue haze" which frequently results from the addition of cobalt in the esterification or polycondensation reaction. Additionally, the present invention yields a resin having good color and little or no haziness.

In application to bottle production, the polyethylene terephthalate produced in accordance with the present invention, by use of the preblended cobalt formulation, yields a clear non-hazy bottle, which exhibits minimal or attenuated color (yellow or blue).

In one aspect, the invention relates to a method of making a PET resin that is further polymerizable by solid-state polymerization and moldable to form a PET article that is transparent and substantially free of hazy and yellow or blue coloration, comprising producing a PET resin by a DMT or TA process, including formation of the monomers, and subjecting the monomers to polycondensation reaction to form PET resin, wherein before the polycondensation reaction, an effective amount of a complex or compound comprising a cobalt compound and a phosphorus compound are added to the reaction vessel, to form a resin that is further polymerizable by solid-state polymerization and moldable to form a PET article that is transparent and substantially free of yellow or blue coloration.

In another aspect, the present invention relates to a method of making a PET resin, comprising the steps of:

reacting dimethyl terephthalate (DMT) or terephthalic acid (TA) with ethylene glycol (EG), in the presence of a catalytically effective amount (if needed) of an esterification catalyst, such as manganese acetate, zinc acetate, or cobalt acetate, to produce monomers;

mixing the monomer with a preblended additive solution comprising cobalt acetate and polyphosphoric acid (PPA) to form a preblended monomer composition; and subjecting the preblended monomer composition to a polycondensation reaction in the presence of a polycondensation catalyst such as antimony trioxide, antimony acetate, titanium butylate, titanium glycolate or titanium oxalate.

Another aspect of the invention relates to a method for mitigating color and haze development in the manufacture of bottles molded from a PET resin, said method comprising the steps of:

reacting a dicarboxylic acid or its ester equivalent with a diol at a temperature from about 150° C. to about 270° C. to start the reaction and form monomer;

preparing an additive complex or composition comprising a cobalt compound and a phosphorus compound;

adding the additive complex or composition before the polycondensation reaction;

subjecting the monomer and additive composition to a polycondensation reaction in the presence of a polycondensation catalyst at a temperature in the range of from about 250° C. to about 300° C., to form the PET resin; and molding the PET resin to form a bottle of mitigated color and haze development.

The invention relates in a further aspect to a cobalt-phosphorus complex or compound for mitigating the development of color and haze in an article molded from a polyester resin, such cobalt-phosphorus complex or compound comprising a cobalt compound and a phosphorus compound.

Another aspect of the invention relates to a preblended additive comprising cobalt acetate and polyphosphoric acid (PPA), useful in the above-described PET process.

Yet another aspect of the invention relates to a molded PET article formed of a PET resin produced by a DMT or TA process, wherein the PET resin has been treated by a cobalt-phosphorus complex or composition comprising the reaction product of a cobalt compound and a phosphorus compound.

Other aspects, features and embodiments of the invention will be more fully apparent from the following disclosure and appended claims.

DESCRIPTION OF THE PREFERRED EMBODIMENTS

The present invention contemplates an improved additive and process for the production of polyester resin and particularly for PET resin for the manufacture of plastic articles, e.g., such as bottles for containing beverages.

All percentages used herein are mole % values, and all part-per-million (ppm) concentrations used herein are weight-based, unless-otherwise expressly specified.

Polyesters are produced from the reaction of one or more dicarboxylic acids (or their ester equivalents) with one or more diols. Suitable dicarboxylic acids are terephthalic acid, isophthalic acid, hemimellitic acid, trimellitic acid, trimesic acid, fumaric acid, maleic acid, sebacic acid, succinic acid, adipic acid, naphthalenedicarboxylic acid, cyclohexanedicarboxylic acid, bibenzoic acid, or a mixture of any of these. The ester equivalents may be, for example, a dimethyl, diethyl, or dipropyl ester of the dicarboxylic acid. Suitable diols are ethylene glycol, diethylene glycol, triethylene glycol, dipropylene glycol, propane diol, butane diol, cyclopentane diol, cyclohexane diol such as cyclohexane dimethanol, and neopentyl diol, or a mixture of these. The term "PET" as used herein is intended to be broadly construed to include "polyethylene terephthalate," and any similar polyesters derived from the reaction of terephthalic acid with one or more diols, such as di-glycol or di-glycol ether, or from the reaction of terephthalic acid diester, for example, dimethyl terephthalate (DMT) and similar diesters, with a di-glycol or di-glycol ether.

The term PET as used herein is also intended to be broadly construed to further include a combination of PET as hereinabove defined, and up to about 20% of non-polyester polymers, such as for example polyolefins, polyamides, and similar compounds known to those skilled in the art as capable of being combined with PET.

The term PET as used herein is intended to be broadly construed to include polyethylene terephthalate per se, and copolymers thereof, such as for example polyethylene-terephthalate-isophthalate, or polyethylene-terephthalate-naphthalate. Also it is sometimes desirable to produce colored bottles or bottles with other desired characteristics, and thus using other conventionally known additives such as pigments, dyes, fillers, branching agents, reheating agents, etc. and these additives, when employed in the resin, are also broadly construed to be within the meaning of PET.

In the present invention, if the DMT process is used, then an ester interchange catalyst must be used. Potentially useful ester interchange catalysts include compounds containing one or more of cobalt, zinc, or manganese. In one embodiment of the present invention, DMT is reacted with EG in a mole ratio of from about 1.9 to about 2.4 in the ester interchange reaction, in the presence of an appropriate catalyst at a level of from about 45 to about 90 ppm.

It is known by those skilled in the art that in the DMT process the ester interchange catalyst must be sequestered or made catalytically inactive by the addition of phosphorous at the termination of the esterification reaction. The phosphorus compound forms a complex with the active catalysts (sequestering the ester interchange catalyst does not affect any polycondensation catalyst that may be present). If the catalyst employed in the ester interchange reaction is not sequestered, then the polymer can readily degrade and exhibit an undesired yellow color. If a phosphorus compound is added to sequester the ester interchange catalyst, it is added separately, after the addition of the ester interchange catalyst, and near the end of the esterification reaction or just before the polycondensation reaction. A typical temperature range for the ester interchange reaction is from about 150° C. to about 270° C. In a preferred embodiment of the invention, the ester interchange temperature does not exceed about 230° C.

In the TA process, no sequestering is necessary because no catalyst is used in the transesterification reaction. For the TA process, the TA is reacted with EG in a mole ratio of from about 1.0 to about 1.4.

The monomer, formed by either process, then undergoes a polycondensation (PC) reaction to yield the desired polyester resin. The polycondensation step (PC) is carried out under high temperature (about 250° C. to about 300° C.) and under vacuum (0.1 to 3 mm torr). Typical catalysts for the polycondensation reaction are antimony acetate, antimony trioxide, titanium butinate, titanium oxylate, or mixtures of these.

In a preferred embodiment of this invention, a phosphorus compound such as polyphosphoric acid (PPA) is rapidly reacted with a cobalt compound (by quickly dumping the phosphorus compound into the cobalt compound) such as cobalt acetate at room temperature with stirring or agitation. After the quick addition of the phosphorus to the cobalt, the preblend is mixed for about 2 hours. This is considered "fast" preblending. In another embodiment, the phosphorus compound is added to the cobalt compound more slowly over a period of 5 to 90 minutes (the result seems not to differ) with stirring or agitation for a total of 2 hours. This is called "slow" preblending. If the preblended complex or compound is to be stored, then it is preferred to have nitrogen in the headspace of the storage vessel to minimize water absorption. High water absorption causes precipitates to form.

The cobalt compounds suitable for the present invention are cobalt acetate, cobalt benzoate, cobalt arsenate, cobalt formate, or mixtures of these. Preferred is cobalt acetate because of its easy in mixing with glycol and because its readily available. The phosphorus compounds suitable with the present invention are phosphoric acid, polyphosphoric acid, and phosphorous acid, or a mixture of these. Although other phosphorus compounds may be suitable, these listed are the most preferred because they easily mix with glycol compounds and thus are easily blended with the cobalt acetate. Of these preferred compounds, the most preferred is PPA.

More specifically, a solution of cobalt acetate in virgin ethylene glycol is prepared by adding cobalt acetate to ethylene glycol. Confirmation that the cobalt acetate is totally dissolved in the glycol is noted by the presence of any particles in the glycol. This typically takes one hour at a minimum. Preferably the phosphorus compound may also be mixed with ethylene glycol, for example. The preferred phosphorus compound is PPA, which readily blends with cobalt acetate. However, it has been observed that using neat PPA results in some precipitates, which must be filtered out. On the other hand, when PPA is blended with glycol, there appears to be little or no visible precipitates. So it is still advantageous to mix the phosphorus compound with glycol. This also permits easy blending of the two-glycol mixtures of cobalt and phosphorus to form the complex or compound. Typically the cobalt-phosphorus complex or compound is prepared with a 30 mole % excess of phosphorus. The preblended cobalt-phosphorus complex or compound is added at the end of the ester interchange (DMT process) or direct esterification (TA process), or at the beginning of polycondensation.

The preblended cobalt-phosphorus complex or compound may suitably be added, in a batch process, over the course of 5 to 10 minutes at the end of the ester interchange/direct esterification, or at the beginning of the polycondensation reaction. Of course, in a continuous process the preblended solution is continuously added. At the end of polycondensation, the vacuum is let down and the resulting amorphous resin is less hazy and more neutral in color.

The resulting amorphous or semicrystaline pellets may then be subjected to solid-state polymerization (SSP). This solid-state polymerization reaction, which further polymerizes the resin, involves heating the pellets below their melting point to a temperature in the range of from about 200° C. to about 240° C. under partial vacuum or in an inert gas flow. The solid-state polymerization reaction can be carried out using fluidized bed reactors, in tumbling chip reactors, or in fixed bed reactors. The typical intrinsic viscosity, IV, of the polymer may be in the range of from about 0.7 to about 0.9 dl/g. The SSP chip can then be melt extruded and molded into containers.

The present invention will now be described more specifically with reference to the following non-limiting examples. It is to be appreciated that the following examples include preferred aspects and embodiments of the present invention for the purpose of illustration and description, and such examples are not intended to be exhaustive or to limit the invention to the precise form disclosed.

THE EXAMPLE

Five cobalt-phosphorus glycol solutions were prepared and PET resin was made with each solution, blown into bottles, and then compared with a control resin, which was also blown into bottles. The five Co—P solutions were:

1) 5% Pre-slow. Prepared a 756 gm (grams) of a 5% by wt. cobalt acetate (CoAc) in ethylene glycol (EG) solution. Prepared a 84.6 gm of a 10% by wt. PPA in ethylene glycol solution. The PPA glycol solution was added slowly over 30 minutes to the cobalt acetate glycol to make a 840.6 gm Co—P solution, at room temperature, with stirring for a total of 2 hours (this included the 30 minutes of PPA addition). This solution was purged and stored with a nitrogen headspace.

2) 10% Pre-slow. Prepared a 378 gm of 10% by wt. CoAc in EG solution. Prepared a 84.6 gm of a 10% by wt. PPA in EG solution. The PPA glycol solution was added slowly over 30 minutes to the cobalt acetate glycol to make a 462.6 gm Co—P solution, at room temperature, with stirring for a total of 2 hours (this included the 30 minutes of PPA addition). This solution was purged and stored with a nitrogen headspace.

3) 5% Pre-fast. Prepared a 756 gm of a 5% by wt. CoAc in EG solution. Prepared a 840.6 gm of a 10% by wt. PPA in EG solution. The PPA glycol solution was added by quickly dumping the entire contents into the CoAc glycol solution to make 840.6 gm Co—P solution, at room temperature, with stirring for a total of 2 hours. This solution was purged and stored with a nitrogen headspace.

4) 10% Pre-fast. Prepared a 378 gm of 10% by wt. CoAc in EG solution. Prepared a 84.6 gm of a 10% by wt. PPA in EG solution. The PPA glycol solution was added by quickly dumping the entire contents into the CoAc glycol solution to make a 462.6 gm Co—P solution, at room temperature, with stirring for a total of 2 hours. This solution was purged and stored with a nitrogen headspace.

5) 10% Pre-fast TBPO. Prepared a 378 gm of 10% by wt. CoAc in EG solution. Prepared a 270 gm of a 10% by wt. tributyl phosphate in EG solution. The TBPO glycol solution was added by quickly dumping the entire contents into the CoAc glycol solution to make a 648 gm Co—P solution, at room temperature, with stirring for a total of 2 hours. This solution was purged and stored with a nitrogen headspace.

For the 5 Co—P preblended solutions and the control, polyethylene terephthalate resin was prepared using the DMT process with manganese acetate employed as the ester interchange catalyst. Antimony trioxide and diethylene glycol (DEG) were also added with the raw materials DMT and EG and MnAc. At the end of ester interchange, or before polycondensation, the phosphorus and cobalt were added followed by isophthalic acid (IPA) (in a 45% by wt. ethylene glycol solution) useful as a crystallization suppression agent in bottle resin. More specifically, for the Control, the P and Co were not preblended, but were added separately. First the P (in the form of PPA) was added to sequester the Mn as an ester interchange catalyst. Then after about 5 minutes cobalt was added as a bluing agent. Lastly after about 5 minutes the IPA was added. Specific details and amounts of the raw materials, the catalyst, the cobalt bluing agent, and the IPA and DEG components for the Control and 5 preblend runs are set forth in Table 1.

In the five cobalt-phosphorus glycol solutions, the cobalt and phosphorus were preblended as described previously and added before polycondensation. All the Co was added in the Co—P solution. However, the P was split and a portion was added as PPA to sequester the MnAc at the end of esterinterchange. After approximately 5 min., the Co—P solution preblend was added. Lastly, after about 5 minutes the IPA was added. In all runs the amount of Co and P added was the same. While the runs described herein call for a specific amount of preblend and PPA added as the sequestering agent, this split may be varied to determine the best results. For example, the PPA added as a sequestering agent was in a 2.2% by wt. ethylene glycol solution. It would also be within the scope of this invention if the PPA were in a 45% by wt. glycol solution. Moreover, the preblend may give best haze results at a 7.5% by wt. Co in a fast blend solution. Also, the preblend may give the best neutral color by using a 3% by wt. Co in a slow blend solution. With the present invention, better results are obtained by preblending Co and P, either fast or slow, compared with not preblending Co and P. The results will vary depending on processing temperatures, reaction times, etc. as is apparent to those skilled in the art, in light of this disclosure.

TABLE 1

| | |
|---|---|
| DMT (Kg) | 199 |
| Glycol (Kg) | 135 |
| MnAc$_2$ (gm) | 65.7 |
| Sb$_2$O$_3$ (gm) | 59.6 |
| Co(oAc)$_2$—4H$_2$O | 37.8 gm |
| DEG (kg) | 1.99(1%wt) |
| IPA (45% slurry) kg | 10.6 |
| IPA (wt %) | 2.4 |

The Control and the five preblended Co—P resin compositions of the invention were used in the manufacture of chips for injection and blow molding. Typical conditions for blow molding bottles are known to those skilled in the art. Generally, the chips were solid-state polymerized to increase the intrinsic viscosity. Then the chips were dried and injection blow molded at a temperature of 520–560° F. to make the performs. The performs were held at ambient conditions for 24 hours and then blown into a 2 liter bottle using a single cavity machine.

The yellowness and brightness (Brtness) of the amorphous resin were measured using the Hunter Lab Scan color equipment. The specific viscosity (SV) was measured in dichloroacetic acid at a 1% by wt. resin solution at 25° C. and converted to intrinsic viscosity (IV) by the following formula: IV=0.691 SV+0.063. Preforms were made and blow-molded into 2 liter bottles. The haze of the bottles was measured using the Hunter Lab Color Quest II Hazemeter as a percent. Zero % haze means the bottle is perfectly clear, as detected within the limits of the apparatus. Yellowness/blueness color is measured with the Hunter Lab Scan Equipment where a positive b* value indicates yellowness (the higher the number the deeper yellow the color) and a negative b* value indicates blueness (the more negative the number the deeper blue the color). The results are summarized in the Table 2 below. The blown bottle data is an average value. For the Control, the average is from 4 tests. For the preblend resins the average is from 7 tests. Compared with the Control, the preblended fast 5% resin produced less hazy bottles. The preblended slow 5% resin produced a less yellow color. The yellowness of the amorphous chip is a different test than the b* yellowness and cannot be directly compared.

TABLE 2

| | Control | Pre-slow 5% | Pre-Slow 10% | Pre-fast 5% | Pre-fast 10% | TBPO |
|---|---|---|---|---|---|---|
| | Amorphous | Resin | Process | Data | | |
| PPA 2.2%) kg | 1.111 | 0.713 | 0.713 | 0.713 | 0.713 | 0.713 |
| Co-P Preblend (gm) | | 841 | 463 | 841 | 463 | 648 |
| EI time (min) | 170 | 150 | 170 | 155 | 165 | 165 |
| PC time (min) | 225 | 215 | 230 | 220 | 200 | 190 |
| PC temp (° C.) | 285 | 286 | 285 | 286 | 285 | 286 |
| | Amorphous | Resin | Analytical | Data | | |
| IV | 0.663 | 0.662 | 0.669 | 0.668 | 0.67 | 0.662 |
| Yellowness | 9.8 | 6.4 | 4.8 | 9.5 | 5.7 | 26.4 |
| Brtness | 37 | 38.2 | 38.7 | 38.2 | 39.1 | 37.8 |
| % DEG (wt %) | 1.04 | 1.06 | 1.15 | 1.1 | 1.12 | 1.23 |
| CEG (meq/kg) | 22 | 21 | 22 | 24 | 20 | 25 |
| Sb (ppm) | 189 | 197 | 174 | 186 | 185 | 206 |
| Mn (ppm) | 69 | 68 | 65 | 66 | 66 | 74 |
| Co (ppm) | 42 | 38 | 40 | 42 | 37 | 45 |
| P (ppm) | 48 | 40 | 44 | 40 | 41 | 38 |
| | Blown | Bottle | Data | | | |
| % Hazy | 1.65 | 1.67 | | .88 | | |
| b* | 1.39 | 1.16 | | 1.43 | | |

While the invention has been described herein with reference to specific embodiments and features, it will be appreciated the utility of the invention is not thus limited, yet, encompasses other variations, modifications, and alternative embodiments. Accordingly, the invention is intended to be broadly construed and interpreted, as comprehending all such alternative variations, modifications, and other embodiments within its spirit and scope.

What is claimed is:

1. A method of making a polyester resin that is further polymerizable by solid-state polymerization and moldable to form an article that is transparent and substantially free of yellow or blue coloration, comprising: reacting either DMT or TA with EG by undergoing an esterification reaction, followed by a polycondensation reaction; and adding before said polycondensation reaction, a preblended cobalt-phosphorus additive.

2. The method of claim 1, wherein said cobalt is selected from the class of cobalt acetate, cobalt benzoate, cobalt arsenate, cobalt formate, or mixtures of these.

3. The method of claim 2, wherein said phosphorus is selected from the class of phosphoric acid, polyphosphoric acid, and phosphorous acid, or a mixture of these.

4. The method of claim 1, wherein said cobalt-phosphorus additive is a glycol solution.

5. The method of claim 4, wherein said preblended additive contains cobalt acetate.

6. The method of claim 5, wherein said preblended additive includes polyphosphoric acid.

7. The method of claim 1, wherein said additive contains a cobalt compound dissolved in glycol.

8. The method of claim 7, wherein said additive contains a phosphorus compound dissolved in glycol.

9. The method of claim 8, wherein said additive is prepared by combining said phosphorus compound to said cobalt compound.

10. The method of claim 9, wherein said combining is accomplished by quickly dumping said phosphorus compound into said cobalt compound.

11. The method of claim 9, wherein said combining is accomplished by slowly adding said phosphorus compound to said cobalt compound for at least 5 minutes.

12. The method of claim 10, wherein said phosphorus compound is polyphosphoric acid and said glycol is ethylene glycol.

13. The method of claim 12, wherein said cobalt compound is cobalt acetate.

14. The method of claim 11, wherein said phosphorus compound is polyphosphoric acid and said glycol is ethylene glycol.

15. The method of claim 14, wherein said cobalt compound is cobalt acetate.

16. A solution for stabilizing polyester resin against the development of color and haze in an article molded from said resin, said solution comprising cobalt compound and phosphorus compound.

17. The solution of claim 16, wherein said cobalt compound is cobalt acetate and said phosphorus compound is polyphosphoric acid.

* * * * *